United States Patent [19]
Doss et al.

[11] 3,907,753
[45] Sept. 23, 1975

[54] SEWAGE AND WATER TREATMENT WITH ALDEHYDE MODIFIED QUATERNARY SALTS OF VINYLPYRIDINE COPOLYMERS

[75] Inventors: Richard C. Doss; James W. Cleary, both of Bartlesville, Okla.

[73] Assignee: Phillips Petroleum Company, Bartlesville, Okla.

[22] Filed: Jan. 21, 1974

[21] Appl. No.: 434,946

Related U.S. Application Data

[62] Division of Ser. No. 210,102, Dec. 20, 1971, Pat. No. 3,806,450.

[52] U.S. Cl. .................... 260/67.5; 260/29.4 UA
[51] Int. Cl.$^2$ ................ C08G 12/22; C08G 12/26
[58] Field of Search ..................... 260/67.5; 210/54

[56] References Cited
UNITED STATES PATENTS

| | | |
|---|---|---|
| 2,811,443 | 10/1957 | Robertson et al. ................ 96/35 |
| 2,811,510 | 10/1957 | Leubner et al. ................... 260/67.5 |
| 2,908,667 | 10/1959 | Williams .......................... 260/67.5 X |
| 2,963,396 | 12/1960 | Padbury et al. .................. 162/168 |
| 3,367,918 | 2/1968 | Lesinski et al. .................. 260/72 |
| 3,472,767 | 10/1969 | Lees ................................ 210/54 X |
| 3,556,932 | 1/1971 | Coscia et al. .................... 260/72 X |
| 3,556,933 | 1/1971 | Williams et al. ................. 260/72 X |
| 3,686,109 | 8/1972 | Aldrich et al. ................... 210/54 |

Primary Examiner—Howard E. Schain

[57] ABSTRACT

Sewage and water are chemically conditioned with modified quaternary salts of vinylpyridine copolymers. Coagulation, flocculation, and filtration in sewage and water treatment processes are significantly improved by the use of the aforesaid modified quaternary salts.

7 Claims, No Drawings

SEWAGE AND WATER TREATMENT WITH ALDEHYDE MODIFIED QUATERNARY SALTS OF VINYLPYRIDINE COPOLYMERS

This is a division of copending application Ser. No. 210,102, filed Dec. 20, 1971, now U.S. Pat. No. 3,806,450.

This invention relates to new modified quaternary salts of vinylpyridine copolymers, to sewage and water treatment with modified quaternary salts of vinylpyridine copolymers, and to the use of modified quaternary salts to improve the rate at which liquid matter is separated from solid matter in sewage and water treatment processes.

During the past decade chemical conditioning of sewage and water with high molecular weight organic molecules has become commercially important. Various polymer types can be substituted for coagulant aids in water treatment, such as ferric chloride or ferric sulfide and lime in order to improve water treatment processes. In general, nonionic polymers if employed alone or in addition to the aforesaid coagulant aids improve efficiency of water treatment to a slight degree. However, more important commercial uses have been found for some specific cationic or anionic polymer types, since certain cationic and/or anionic polymers when used in small amounts produce conditioned sewage and/or water that permit solids in sewage and water to be coagulated, fluocculated or filtered under highly efficient economical processing conditions. With the ever increasing density of population and industrial expansion, the need for efficient water and sewage treatment continues to grow rapidly. Accordingly, the search continues for highly efficient economical water and sewage chemical conditioners.

It is an object of this invention to provide modified quaternary salts of high molecular weight copolymers suited to chemical treatment of sewage. Another object is to provide modified quaternary salts of high molecular weight copolymers suited to chemical treatment of water. Another object is to provide improved methods for the separation of solid matter from liquid matter during processing of sewage. Still another object is to provide improved methods for separating solid matter from liquid matter in water treatment operations. A further object is to provide modified quaternary salts of high molecular weight copolymers that are economically and commercially important in the treatment of water and sewage derived from municipal and industrial waste. Other objects will be apparent from the specification and the appended claims.

In accordance with this invention it has been found that modified quaternary salts of vinylpyridine copolymers are advantageously employed in sewage and water treatment. It has also been found that the efficiency of separation of solid matter from liquid matter is significantly improved when sewage and water treatment processes employ modified quaternary salts of vinylpyridine copolymers. These modified quaternized vinylpyridine copolymers increase the settling rate of solids and make easier the removal of such solids in filtration and centrifugation processes.

Among the quaternary salts of vinylpyridine copolymers that can be employed in the preparation of the modified quaternary salts of vinylpyridine copolymers which are useful in accordance with this invention are quaternary salts of vinylpyridine copolymers that contain recurring units that can be represented by the following formulas:

(I) 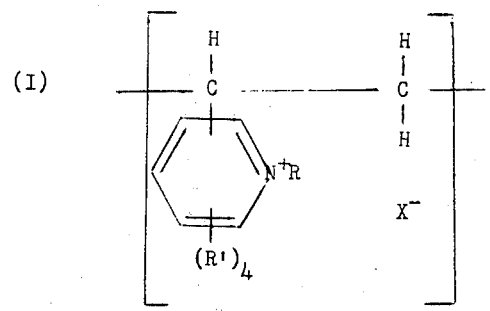

wherein each unit R independently represents the same or a different alkyl group, preferably having from 1 to 4 carbon atoms; each unit R' independently is selected from hydrogen and alkyl groups, preferably having from 1 to 7 carbon atoms per alkyl group; the total number of carbon atoms in all of the R' groups in each recurring unit being 0 to about 12, and each unit X is selected from $RSO_4$, Cl, and Br; and (II) 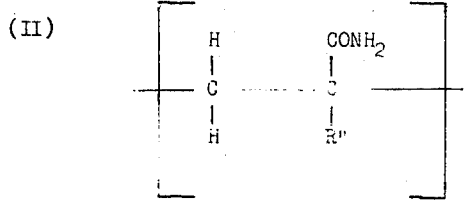

wherein R'' is hydrogen or methyl; and wherein said quaternized copolymer exhibits an inherent viscosity of about 0.5–12 when measured at 30°C in a 0.2 molar aqueous sodium chloride solution at a polymer concentration of 0.01 gram per 100 milliliters of solution.

The normally solid high molecular weight quaternary salts of vinylpyridine copolymers, containing recurring units identified by Formulas I and II described hereinbefore and useful in the production of the modified quaternized vinylpyridine copolymers of this invention, are readily prepared by processes well known in the art. Such processes include copolymerization of acrylamide or methacrylamide with an adduct of a vinylpyridine and either a dialkyl sulfate, an alkyl chloride, or an alkyl bromide, the copolymerization being conducted in a suitable solvent in the presence of a suitable catalyst substantially in the absence of air. For example, an aqueous solution of acrylamide, or methacrylamide, and alkylvinylpyridinium salt, i.e., an adduct of a vinylpyridine and a dialkyl sulfate or an alkyl chloride or bromide, containing a free radical-generating catalyst, preferably a water-soluble, organic or inorganic peroxide, e.g., potassium persulfate ($K_2S_2O_8$), is maintained in an inert atmosphere at a temperature within the range of about 0° to 100°C, preferably 20° to 80°C, for a time within the range of about 10 minutes to about 5 days, preferably 30 minutes to 2 days. Although the resulting quaternized copolymer can be separated from the solution, e.g., by distillation of the water, the aqueous solution of the quaternized copolymer can be employed directly, without isolation of the polymer, to produce the modified quaternized vinylpyridine copolymer of this invention.

In the production of the unmodified quaternized copolymer, the quaternized vinylpyridine monomer should constitute about 1 to about 50, preferably about 3 to about 30, weight percent of the monomers used in the preparation of the copolymer, i.e., of the quaternized vinylpyridine monomer plus the acrylamide or methacrylamide monomer.

If desired, the unmodified quaternized copolymer can be prepared by first copolymerizing the nonquaternized vinylpyridine monomer with acrylamide or methacrylamide by procedures well known in the art, followed by quaternization of the resulting polymer with a dialkyl sulfate or an alkyl chloride or bromide. For example, a mixture of the nonquaternized copolymer and the quaternizing agent can be maintained at a temperature of about 50° to about 250°C for a time within the range of about 5 minutes to about 72 hours. The resulting quaternized copolymer can be employed directly, without purification, to produce the modified quaternized vinylpyridine copolymer of this invention.

The modified quaternized copolymers of this invention, i.e., the modified quaternized copolymers of vinylpyridines and acrylamide or methacrylamide, are produced by reacting the unmodified quaternized copolymers described above with an aldehyde having the formula R'''CHO, wherein R''' is hydrogen, a monovalent saturated hydrocarbyl radical, or a monovalent aromatic radical. If desired, mixtures of aldehydes can be used. The aldehydes employed should contain from 1 to about 7 carbon atoms, preferably 1 to 3 carbon atoms. Formaldehyde is the presently preferred aldehyde. Examples of other aldehydes which can be used include acetaldehyde, propionaldehyde, butyraldehyde, isobutyraldehyde, isovaleraldehyde, hexanal, heptanal, cyclohexanecarboxaldehyde, 3-methylcyclopentanecarboxaldehyde, benzaldehyde, and the like, and admixtures thereof.

In the preparation of the modified quaternized copolymer, the aldehyde should be employed in an amount of about 0.01 to about 20 weight percent, preferably about 2 to about 7 weight percent, based on the amount of unmodified quaternized copolymer used. Although the reaction temperature can vary within a considerable range, the temperature generally will be within the range of about 10° to 100°C, preferably about 20° to about 80°C. The reaction time can vary widely, depending in part on the reaction temperature, but generally will be within the range of about 10 minutes to about 5 days, preferably about 1 hour to about 30 hours. Although the reaction is conveniently conducted at atmospheric pressure, higher or lower pressures can be employed. The reaction is conducted in an aqueous solution, preferably essentially water, in which the unmodified as well as the modified quaternized copolymer is soluble. Although the modified quaternized copolymer can be isolated, e.g., by distillation of water or by precipitation by dilution with a substance such as acetone, it is convenient to employ the aqueous solution directly, without isolation of polymer, in the treatment of water or sewage.

The water-soluble, normally solid, modified quaternized copolymer thus produced for use in the treatment of water or sewage should have an inherent viscosity of about 0.5 to 12, preferably 2 to 8, when measured at 30°C in a 0.2 molar aqueous sodium chloride solution at a polymer concentration of 0.01 gram per 100 milliliters of solution.

The amount of modified quaternary salt of vinylpyridine copolymer employed in sewage and water treatment processes in accordance with this invention can vary from about 0.01 to as much as 1,000 parts per million by weight, or greater, preferably about 0.1 to about 500 parts per million by weight, of the total solid and liquid matter to be treated. Amounts varying from about 1 part per million to about 100 parts per million are especially preferred since exceptionally high rates of separation of solids from liquids are obtained when said quantities are employed.

The term "sewage treatment" as employed herein is intended to describe or include any treatment of suspensions or solutions containing solid waste and/or liquid waste common to humans and animals, and/or inorganic matter often times associated with industrial waste products. The modified quaternized vinylpyridine copolymers are particularly advantageous when used in aerated sewage.

The term "water treatment" as employed herein is intended to describe or include the treatment of any source of water substantially free of organic matter but not chemically pure because of impurities such as dissolved mineral matter, gases, turbidity and sediment, color, taste and odors.

In general, this invention includes chemical treatment or conditioning of any water source derived from surface supplies, i.e., rivers, creeks, canals, ponds, lakes, reservoirs, or ground water supplies, i.e., deep wells, shallow wells, springs, mines or infiltration galleries.

Set out hereafter are examples which illustrate the best modes of practicing this invention. These examples are not intended to restrict the scope of this invention unnecessarily thereto.

EXAMPLE I

In the preparation of a 1,2-dimethyl-5-vinylpyridinium methyl sulfate/acrylamide copolymer, herein designated as DMPMS/A copolymer, 5.0 g. of 1,2-dimethyl-5-vinylpyridinium methyl sulfate, 45.0 g. of acrylamide, 0.0125 g. of potassium persulfate, and 200 g. of water (previously boiled and cooled) were charged to a 10-oz. polymerization bottle. The bottle was then sealed, and the mixture was shaken at 50°C for 24 hours. An aliquot of the resulting aqueous solution of DMPMS/A copolymer was diluted with acetone, and the mixture was agitated in a Waring blender, to obtain the DMPMS/A copolymer as a solid having an inherent viscosity of 5.19 when measured at 30°C in a 0.2 molar aqueous sodium chloride solution at a polymer concentration of 0.01 g. per 100 ml. solution.

In the preparation of a formaldehyde-modified 1,2-dimethyl-5-vinylpyridinium methyl sulfate/acrylamide copolymer, herein designated as $CH_2O$-modified DMPMS/A copolymer, a mixture of 10.25 g. of the aqueous solution of DMPMS/A copolymer containing 2.05 g. of the polymer, 89.75 g. of water, and 0.35 g. of 37 weight percent aqueous formaldehyde (0.13 g. $CH_2O$) was shaken mechanically in a 150-ml. mixing bottle for 24 hours at about 25°C. The resulting solution was heated at about 50° to 80°C on a steam bath for 1 hour, the mixture was cooled and diluted with acetone, and the resulting mixture was agitated in a Waring blender to obtain the desired $CH_2O$-modified DMPMS/A copolymer as a solid having an inherent viscosity of 7.42 when measured at 30°C in a 0.2 molar aqueous sodium chloride solution at a polymer concentration of 0.1 g. per 100 ml. solution.

The above $CH_2O$-modified DMPMS/A copolymer was evaluated as a flocculant for kaolin clay, for secondary sewer sludge, and for sludge from a municipal water treatment plant. The kaolin clay was used as a 1 weight percent suspension in water. The secondary sewer sludge was an aqueous suspension obtained from the aerobic digestion return line of a municipal sewer system; the sewer sludge contained about 0.5 weight percent solids. The sludge from a municipal water treatment plant was an aqueous suspension containing about 0.5 to 0.8 weight percent solids. The settling rate of the solid in each of the three suspensions, upon treatment with a flocculant of this invention, was then determined by the following procedure. In each of the tests a measured amount of an aqueous 0.1 weight percent solution of $CH_2O$-modified DMPMS/A copolymer was added to 100 ml. of the suspension in a 100-ml. graduated cylinder, and the cylinder was stoppered. The cylinder was then inverted 20 times, after which the flocculated solid material was allowed to settle. Determined then was the time required for the flocculated solid material to settle to the extent that the volume of the supernatant liquid above the flocculated solid material was equal to 50 ml. The settling rate, defined herein as the average rate at which the flocculated solid material settled during the time required for clarification of the upper 50 ml., and expressed in ml/minute, was calculated by dividing 50 ml. by the settling time requirement in minutes. For the purpose of comparison, three related commercial polyelectrolyte flocculants were evaluated under like conditions, and additional control tests were conducted in which no flocculant was employed. In each of the tests in which any one of the four polyelectrolyte flocculants was used, the flocculant was employed as an aqueous 0.1 weight percent solution in an amount calculated to provide, by weight, 1 part flocculant per million parts aqueous kaolin clay suspension, 20 parts flocculant per million parts secondary sewage sludge, or 10 parts flocculant per million parts sludge from the municipal water treatment plant. The results of these tests are summarized in Table I.

TABLE I

| Flocculant | Settling Rate, ml./min. | | |
|---|---|---|---|
| | Aqueous Kaolin Clay Suspension | Secondary Sewer Sludge | Municipal Water Treatment Plant Sludge |
| $CH_2O$-Modified DMPMS/A Copolymer | 97 | 0.42 | 16.7 |
| | 27 | 0.21 | 0.33 |
| Purifloc C-31[1] | | | |
| Polyfloc 1150[2] | 106 | 0.14 | 10.4 |
| Polyfloc 1100[3] | 250 | 0.14 | 139 |
| None | 8 | 0.14 | 0.13 |

[1]Polyamine polymer; cationic flocculant (Dow Chemical Company).
[2]Acrylamide copolymer; cationic flocculant (Betz Laboratories, Inc.)
[3]Acrylamide copolymer; anionic flocculant (Betz Laboratories, Inc.)

As shown in Table I, the settling rate for all three suspensions was greatly increased by use of the $CH_2O$-modified DMPMS/A copolymer as compared with the settling rate observed when no flocculant was employed. For secondary sewer sludge the $CH_2O$-modified DMPMS/A copolymer was superior to any of the three commercial polyelectrolyte flocculants, for municipal water treatment plant sludge it was superior to either of the commercial cationic flocculants, and for the aqueous kaolin clay suspension it was nearly as good as the better of the two commercial cationic flocculants.

The $CH_2O$-modified DMPMS/A copolymer was also demonstrated to be effective in improving the rate of filtration of solids from the secondary sewer sludge and from the municipal water treatment plant sludge.

EXAMPLE II

The settling rate of kaolin clay from aqueous suspensions containing 1 weight percent of the clay was determined in each of a series of tests in which there was employed a flocculant prepared by reacting the DMPMS/A copolymer of Example I with varying amounts of formaldehyde essentially by the procedure shown in Example I. The results are summarized in Table II, in which the numbers in the first column represent the weight percent of $CH_2O$, based on weight of the unmodified DMPMS/A, used to prepare the formaldehyde-modified copolymer which provided the kaolin settling rate shown when the modified copolymer was employed in an amount of 1 part by weight per million parts kaolin suspension. In each instance the inherent viscosity and settling rate were determined as described in Example I.

TABLE II

| Modified Polymer, Wt. % $CH_2O$ Used | Inherent Viscosity | Settling Rate, Ml./Min. |
|---|---|---|
| 0 | 5.19 | 49 |
| 2.7 | 6.09 | 79 |
| 6.3 | 7.42 | 97 |
| 10.7 | —[1] | 61 |
| 15.6 | —[1] | 73 |

[1]Polymer not completely soluble in 0.2 molar aqueous sodium chloride at 30°C.

As shown in Table II, the settling rate of the kaolin clay was greater when the DMPMS/A copolymer was modified by reaction with any of various amounts of formaldehyde prior to use as a flocculant. The modified polymer having the inherent viscosity of 7.42, determined as shown in Example I, was the $CH_2O$-modified polymer whose use was described in Example I.

The increased efficiency in the removal of solids from liquid matter in sewage and water treatment processes by the use of modified quaternized copolymers of vinylpyridines and acrylamide or methacrylamide as described herein can be employed in any process common to the art for water and sewage treatment. Illustrative of common sewage treatment operations include primary and secondary clarification operations, sludge conditioning of activated sludge, raw sewage, digested sewage, digested activated sewage, or raw plus activated sewage. Any method of separating solids from liquids can be employed in the practice of this invention including filtration by the use of filter trays, centrifugation, flotation thickening, sludge bed drawing and the like. Other processes and process equipment as well as other applications of this invention will be apparent to those skilled in the art.

That which is claimed is:

1. A composition comprising a water-soluble, normally solid reaction product of reactants consisting essentially of (A) an aldehyde containing from 1 to 7 carbon atoms and represented by the formula R'''CHO wherein R''' is selected from the group consisting of hydrogen, and a monovalent saturated hydrocarbyl radical, and (B) a quaternary salt of a vinylpyridine-acrylamide copolymer consisting essentially of recurring units represented by the following formulas:

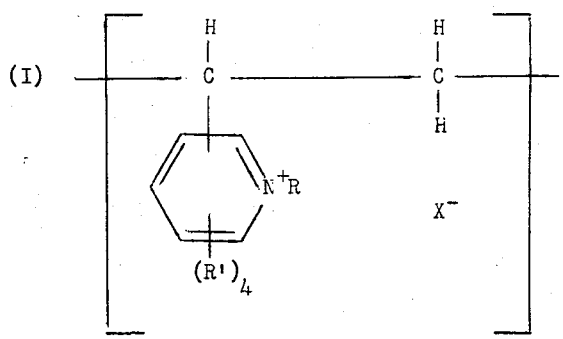

wherein each unit R independently represents the same or a different alkyl group having from 1 to 4 carbon atoms, each unit R' independently is selected from hydrogen and alkyl groups having from 1 to 7 carbon atoms, the total number of carbon atoms in all of the R' groups in each recurring unit being from 0 to 12, each unit X is selected from $RSO_4$, Cl and Br; and

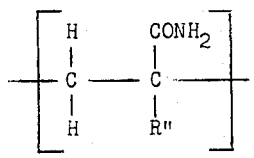

wherein R'' is hydrogen or methyl; wherein said quaternary salt comprises from about 1 to about 50 weight percent of said formula (I) units, and wherein said aldehyde is employed in an amount in the range of about 2 to about 20 weight percent based on the amount of said quaternary salt.

2. A composition in accordance with claim 1 wherein said reaction product has an inherent viscosity of about 0.5 to about 12, when measured at 30°C in a 0.2 molar aqueous sodium chloride solution at a concentration of 0.01 gram per 100 milliliters of solution.

3. A composition in accordance with claim 1 wherein said reaction product is a formaldehyde modified 1,2-dimethyl-5-vinylpyridinium methyl sulfate/acrylamide copolymer.

4. A composition in accordance with claim 1 wherein said quaternary salt comprises from about 3 to about 30 weight percent of said formula (I) units, wherein said aldehyde contains from 1 to 3 carbon atoms, and wherein said aldehyde is employed in an amount in the range of about 2 to about 7 weight percent based on the amount of said quaternary salt.

5. A composition in accordance with claim 1 wherein said aldehyde is formaldehyde.

6. A composition in accordance with claim 1 wherein said copolymer is a copolymer of 1,2-dimethyl-5-vinylpyridinium methyl sulfate and acrylamide.

7. A composition in accordance with claim 1 wherein said aldehyde contains from 1 to 3 carbon atoms.

* * * * *